US012305932B2

(12) United States Patent
Carlson et al.

(10) Patent No.: US 12,305,932 B2
(45) Date of Patent: May 20, 2025

(54) FLOW ASSISTED ANTI-FOULING GEOMETRIES FOR COMPACT HEAT EXCHANGERS

(71) Applicants: National Technology & Engineering Solutions of Sandia, LLC, Albuquerque, NM (US); Vacuum Process Engineering, Inc., Sacramento, CA (US)

(72) Inventors: Matthew David Carlson, Highlands Ranch, CO (US); Blake Lance, Albuquerque, NM (US); Parker Riley Lyons, Herriman, UT (US); Dereje Amogne, Rocklin, CA (US); Aaron Wildberger, El Dorado Hills, CA (US)

(73) Assignees: National Technology & Engineering Solutions of Sandia, LLC, Albuquerque, NM (US); Vacuum Process Engineering, Inc., Sacramento, CA (US)

( * ) Notice: Subject to any disclaimer, the term of this patent is extended or adjusted under 35 U.S.C. 154(b) by 40 days.

(21) Appl. No.: 18/509,985

(22) Filed: Nov. 15, 2023

(65) Prior Publication Data

US 2024/0210133 A1    Jun. 27, 2024

Related U.S. Application Data

(62) Division of application No. 17/153,753, filed on Jan. 20, 2021, now Pat. No. 11,821,696.

(51) Int. Cl.
*F28F 19/01* (2006.01)
*B01D 29/01* (2006.01)
(Continued)

(52) U.S. Cl.
CPC .............. *F28F 19/01* (2013.01); *B01D 29/01* (2013.01); *B01D 29/66* (2013.01); *F28G 9/00* (2013.01);
(Continued)

(58) Field of Classification Search
CPC ................ F28G 9/00; B01D 2201/086; B01D 2201/184; F28F 9/0265; F28F 2250/00; F28F 2265/02; F28F 2265/22
See application file for complete search history.

(56) References Cited

U.S. PATENT DOCUMENTS 2,118,344 A    5/1938    Erickson
2,149,594 A    2/1950    Tomel
(Continued)

FOREIGN PATENT DOCUMENTS

CN    1192254 A  *  9/1998    ........... B01D 29/356

*Primary Examiner* — Tho V Duong
(74) *Attorney, Agent, or Firm* — Daniel J. Jenkins

(57) ABSTRACT

A header for a heat exchanger and method for cleaning a heat exchanger in a loop without disconnecting loop components is provided. The header is in flow communication with the heat exchanger for distributing fluid through a plurality of adjacent channels. The header is connected between a main heat exchanger inlet nozzle and a channel flow distributor. A filter element is disposed within the header between the nozzle and channel flow distributor. Under normal operation, the filter element removes particulates and fouling material from the main flow stream before it enters the heat exchanger channels. During the cleaning process, fluid is injected on or through the filter element to remove particulates and fouling material through at least one outlet port. The header arrangement allows the filter element to be 'cleaned in place' without draining the system and disconnecting the heat exchanger or other components from the flow loop.

2 Claims, 12 Drawing Sheets

(51) Int. Cl.
   *B01D 29/66* (2006.01)
   *F28G 9/00* (2006.01)
   *F28F 9/02* (2006.01)

(52) U.S. Cl.
   CPC .. *B01D 2201/086* (2013.01); *B01D 2201/184* (2013.01); *F28F 9/0265* (2013.01); *F28F 2250/00* (2013.01); *F28F 2265/02* (2013.01); *F28F 2265/22* (2013.01)

(56) References Cited

U.S. PATENT DOCUMENTS

| | | | | |
|---|---|---|---|---|
| 2,498,594 | A | * | 2/1950 | Tomel .................. F28F 19/01 |
| | | | | 165/72 |
| 3,191,672 | A | | 6/1965 | Logan |
| 4,497,363 | A | * | 2/1985 | Heronemus .......... F28D 9/0006 |
| | | | | 165/95 |
| 5,141,631 | A | * | 8/1992 | Whitman ............. B01D 29/96 |
| | | | | 210/138 |
| 5,598,889 | A | * | 2/1997 | Jackson .............. B01D 33/503 |
| | | | | 165/95 |
| 5,975,311 | A | * | 11/1999 | Jackson ............... B01D 33/50 |
| | | | | 210/411 |
| 8,057,685 | B2 | * | 11/2011 | Laing ................ B01D 29/6476 |
| | | | | 210/791 |

* cited by examiner

FLOW ASSISTED ANTI-FOULING GEOMETRIES FOR COMPACT HEAT EXCHANGERS

RELATED APPLICATION

This application is a divisional application of U.S. application Ser. No. 17/153,753, filed Jan. 20, 2021, entitled "FLOW ASSISTED ANTI-FOULING GEOMETRIES FOR COMPACT HEAT EXCHANGERS," which is incorporated herein by reference.

STATEMENT REGARDING FEDERALLY SPONSORED RESEARCH OR DEVELOPMENT

This invention was developed under Contract No. DE-NA0003525 awarded by the United States Department of Energy/National Nuclear Security Administration. The Government has certain rights in this invention.

BACKGROUND OF THE INVENTION

The application generally relates to heat exchangers. The application relates more specifically to compact heat exchangers having geometric arrangements for filtration and flushing.

Microchannel heat exchangers (MCHEs) provide improved performance and size reductions in several industrial processes. High pressure fluid heat exchange may be used in high efficiency power conversion such as the super-critical $CO_2$, or $sCO_2$, power cycles and hydrogen fueling stations. FIGS. 1 and 1A show an exemplary prior art design of an MCHE 2 including an MCHE body 4 including a core 5 having channels 6 disposed in a matrix 7, and headers 8. The channels 6 are configured in the core 5 via bends, turns and/or other flow path arrangements to allow a first and second fluid to flow in flow channels 6a, 6b, respectively, and to enter and exit headers 8 as shown in FIG. 1. In this exemplary, as in an embodiment, the channels 6 may be microchannels. While smaller diameter channels, such as microchannels, approximately 1 millimeter (mm), provide exceptional surface area density, they can become clogged by debris and require interruption of the industrial process to be cleaned.

Prior methods used to mitigate particulate fouling include dead-end filters such as cartridge filters placed upstream of the heat exchanger. Dead-end filters must be serviced or replaced after some period of operation. Alternately, the heat exchanger must be replaced at the end of its service life. Both mitigation techniques add operational cost and capital cost over the life of a heat exchanger. In addition, there is added complexity associated with the heat exchanger to provide servicing of the filtration mechanism or replacement of the heat exchanger. The use of a conventional dead-end filter in series with the heat exchanger imposes a pressure drop which adversely impacts overall system efficiency, and in particular an increase in the levelized cost of electricity for $sCO_2$ power cycles due to a reduction in efficiency.

As prior methods of heat exchanger cleaning are costly and interrupt industrial processes, there is a need for systems and methods that overcomes the deficiencies of the prior art and demonstrate improved performance or provide other advantageous features. Other features and advantages will be made apparent from the present specification. The teachings disclosed extend to those embodiments that fall within the scope of the claims, regardless of whether they accomplish one or more of the aforementioned needs.

SUMMARY OF THE INVENTION

This invention leverages unique geometries to provide for filtration and flushing in compact heat exchangers and avoid the cost and complexity of conventional approaches. These geometries can be divided into three categories: structures to enable back-flushing of the heat exchanger core inlet face, structures that allow for cross-flow removal of the formed filter cake using the shear stress of the primary fluid, and structures that induce turbulent vortical flows to enable cross-step filtration or localized vortical cleaning of the heat exchanger core face under off-nominal fluid flow regimes.

One embodiment relates to a header for a heat exchanger. The header is in flow communication with the heat exchanger for distributing fluid through a plurality of adjacent channels. The header is connected between a main exchanger supply line and a channel flow interface. The header includes a housing having a first cavity with one or more inlet ports and a second cavity with one or more outlet ports. A screen portion is disposed between the first cavity and the second cavity. A fluid is injected on to the screen portion through the inlet port to entrain in a flow path particulates and fouling accumulated on the screen and remove the entrained particulates and fouling through the at least one outlet port.

Another embodiment relates to a header for a heat exchanger. The header is in flow communication with the heat exchanger for distributing fluid through a plurality of adjacent channels in the heat exchanger. The header is connected between a main heat exchanger supply line and a channel flow interface. The header includes a housing with a main cavity. The main cavity has an inlet port and an outlet port disposed on an end of the main cavity opposite the inlet port. A screen portion is in fluid communication with the heat exchanger. The screen portion is disposed between the inlet port and the outlet port. The inlet port and the outlet port are arranged to generate a flowpath of fluid across the screen portion to induce shear forces across the screen portion sufficient to dislodge accumulated particulates and fouling.

Another embodiment relates to a method for flow-assisted anti-fouling in a heat exchanger loop. The method includes providing a heat exchanger and a header portion attached to the heat exchanger at an input interface; shutting off a primary heat exchanger flow of the heat exchanger; opening a secondary flow path to generate a cleaning flow across the header portion; flushing a screen filter portion disposed within the header portion to remove a particulate matter and fouling material via a flowpath entering the header portion from a header inlet port and discharging through a header outlet port, the flowpath isolated from a main heat exchanger loop of the heat exchanger; and removing the particulate matter and fouling material by vortical motion inside cavities/wells to prevent obstructions in the heat exchanger channels.

Another embodiment relates to a method for flow-assisted anti-fouling in a heat exchanger system. The method includes a heat exchanger and a header portion attached to the heat exchanger at an input interface that includes a screen filter. To support cleaning, the fluid system is configured to direct flow optionally in a reversed direction through the heat exchanger, removing particulate matter and fouling material, to another portion of the flow system for removal. This embodiment has the advantage of a no extra ports in the header portion of the heat exchanger.

An advantage of the disclosure is that the disclosed systems and methods provide for longer cleaning intervals or avoid cleaning in the operation of compact heat exchangers. Compact heat exchangers have proliferated in industrial use due to the high energy density and smaller footprint that characterizes such devices. In particular, where expensive base metals are used, compact heat exchangers advantageously lower manufacturing costs. However, in order to achieve these benefits, the channel passages in the units are reduced from between 0.5" (12.7 mm) and 1" (25.4 mm) diameters down to 0.005" (0.127 mm) to 0.01" (0.0254 mm) diameters. This reduction in channel dimensions leads to a chronic risk of heat exchanger particulate fouling wherein foreign debris accumulates in the small passages and reduces flow area or completely blocks channels and reduces heat exchanger performance.

Another advantage the disclosed techniques provide is a design to make cleaning the channels much easier while improving flow uniformity and lowering manufacturing costs. in order of priority, cleaning in place, flow uniformity, and cost. Incorporating a screen or filter in the header can normalize local pressure gradients and increase flow uniformity. Incorporating cleaning features in the heat exchanger is expected to reduce system cost.

Alternative exemplary embodiments relate to other features and combinations of features as may be generally recited in the claims.

BRIEF DESCRIPTION OF THE DRAWINGS

The application will become more fully understood from the following detailed description, taken in conjunction with the accompanying figures, wherein like reference numerals refer to like elements, in which.

DETAILED DESCRIPTION OF THE INVENTION

Before turning to the figures which illustrate the exemplary embodiments in detail, it should be understood that the application is not limited to the details or methodology set forth in the following description or illustrated in the figures. It should also be understood that the phraseology and terminology employed herein is for the purpose of description only and should not be regarded as limiting.

Figure 1:
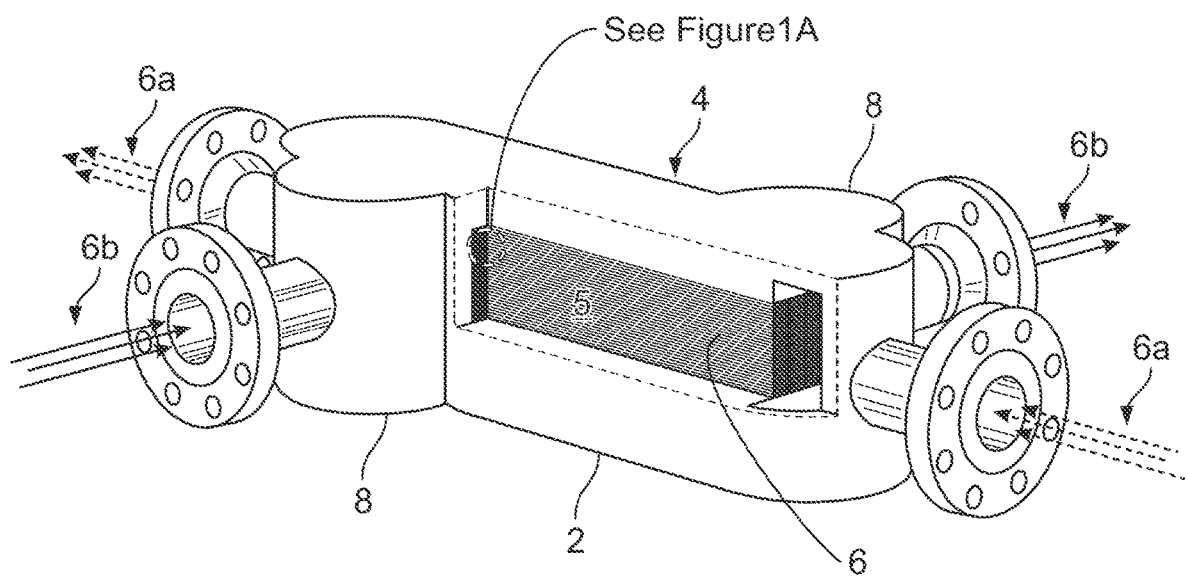
FIG. 1 shows a prior art MCHE.
Figure 1A:
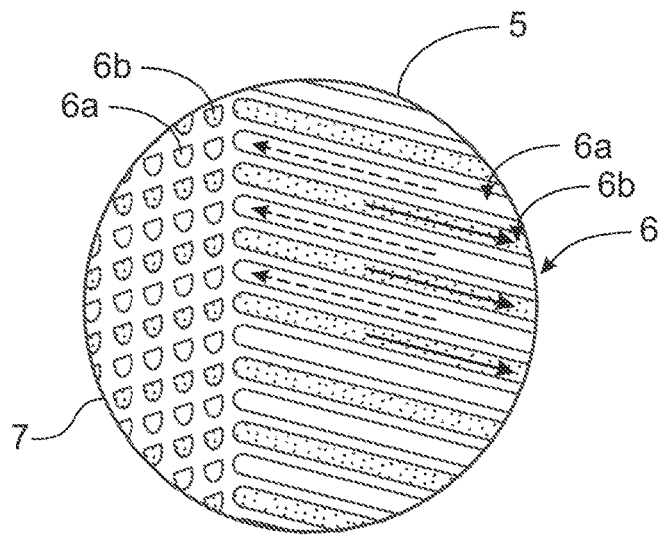
FIG. 1A shows an enlarged detail of the channel arrangement of portion 1A of FIG. 1.
Figure 2:
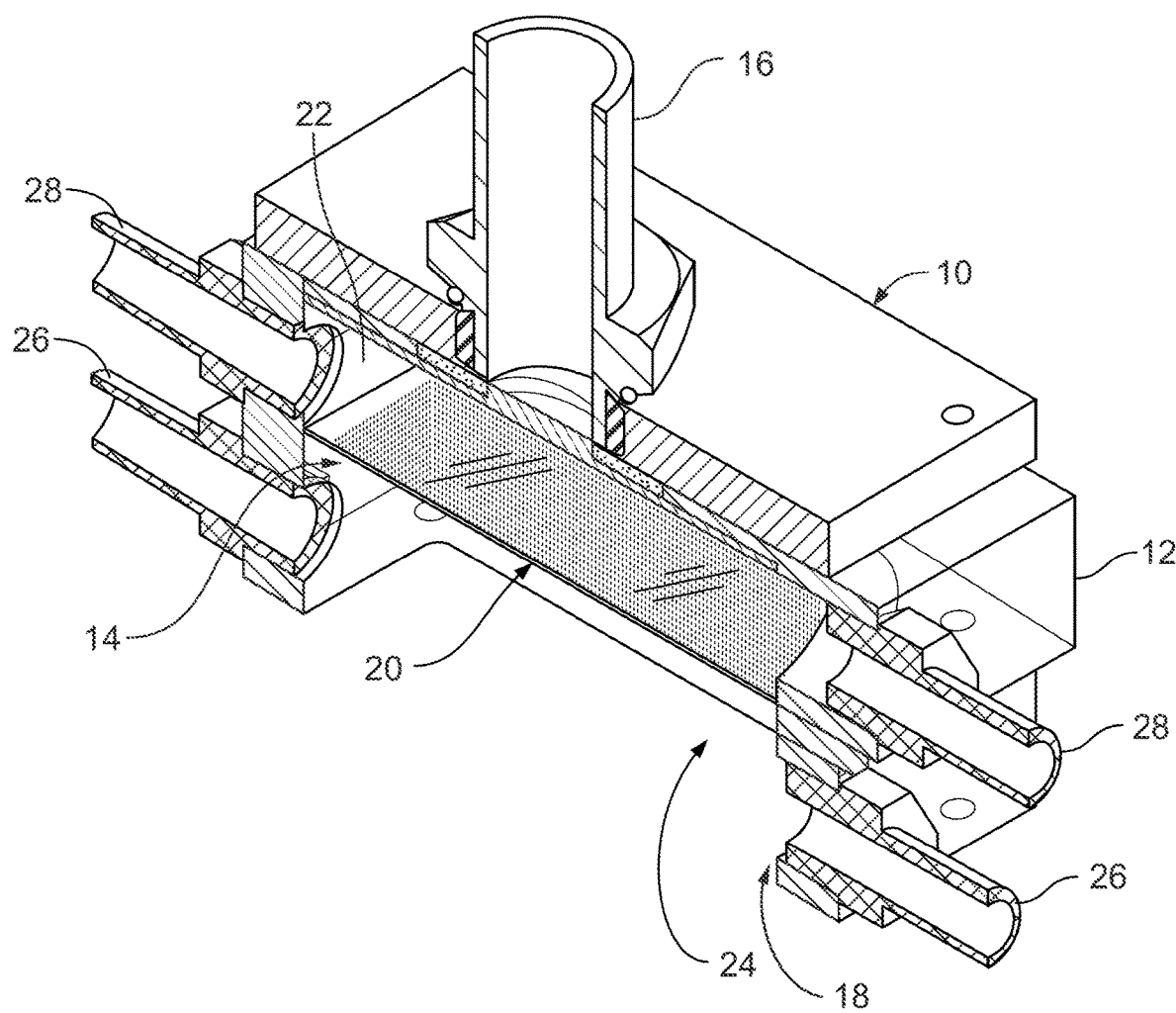
FIG. 2 is a perspective view of a header according to an embodiment of the invention that has side ports.

FIG. 2 shows a cross sectional view of a header 10 according to an embodiment of the disclosure. As can be seen in FIG. 2, the header 10 includes a housing 12 that defines a cavity 14, an inlet port 16 and an outlet opening 18, and a screen 20 that divides the cavity 14 into an upper cavity 22 and a lower cavity 24. Header 10 further includes cleaning inlet ports 26 and cleaning outlet ports 28.

Figure 2A:
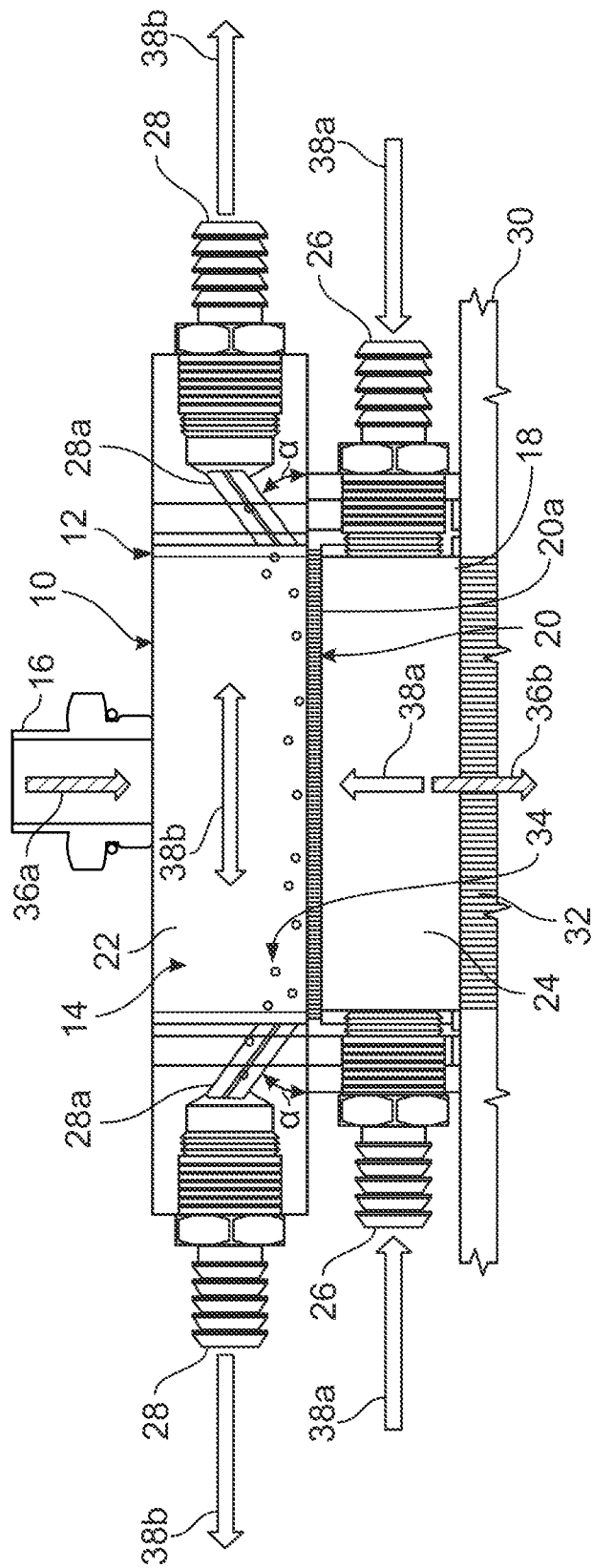
FIG. 2A is a cross sectional view of the header of FIG. 2 and a partial cross-sectional view of a portion of an MCHE body to which it is attached according to an embodiment of the invention.

FIG. 2A shows a cross sectional view of the header 10 attached to a partial cross-sectional view of an MCHE core body 30 having microchannels 32. In this exemplary embodiment, the screen 20 is an independent component inserted into the header 10. In other embodiments, the screen 20 may be an integral part of the housing 12. The cleaning inlet ports 26 allow fluid to be injected into the lower cavity 24 and removed via the cleaning outlet ports 28 along with particulates and fouling material or contaminants (collectively referred to as contaminants) 34 that have collected on the screen 20 and/or are present in the upper cavity 22.

Under operational flow conditions, a fluid enters the cavity 14 of the header 10 via inlet port 16 as indicated by arrow 36a. The fluid passes through the upper cavity 22 and the screen 20 and into the lower cavity 24 and exits the header outlet 18 to enter microchannels 32 of the heat exchanger core 30 as indicated by arrow 36b.

For backflush operation, which may be referred to as a reverse flow or backflow operation, a fluid is provided to cleaning inlet ports 26 as shown by arrows 38a and discharged through cleaning outlet ports 28 as indicated by arrows 38b to flush contaminants 34 from the screen 20 and upper cavity 22. In this exemplary embodiment, the header 10 is shown having two cleaning inlet and outlet ports 26, 28, however, in other embodiments, the header 10 may have one or more cleaning inlet or outlet ports.

Figure 2B:
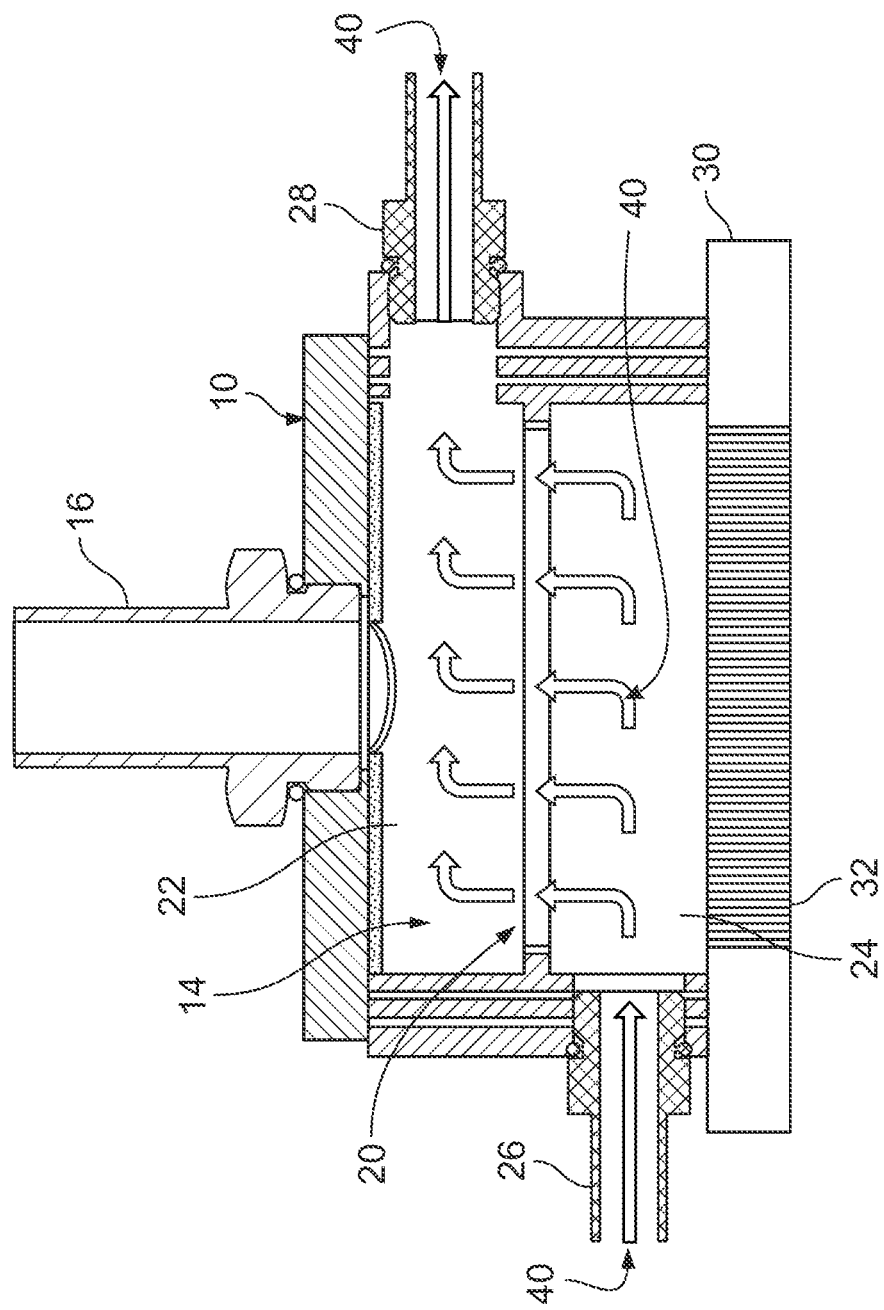
FIG. 2B is a cross sectional view of a header and a partial cross-sectional view of a portion of a heat exchanger body to which it is attached, and showing flushing fluid flow path, according to another embodiment of the present invention.

FIG. 2B shows an embodiment of a header 10 having one cleaning inlet port 26 and one cleaning outlet port 28. Arrows 40 show the general overall flow path of the backflushing fluid.

Referring again to FIG. 2A, in another embodiment that includes a reverse flush operation, a fluid may be provided to the cavity 14 from the heat exchanger core via the microchannels 32 and extracted through outlet port 28 and/or inlet 16. In this embodiment, fluid flow in or out of inlet ports 26 is blocked. In alternate embodiments, header 10 may include one or more inlets 16 and one or more outlet ports 28. Additionally in backflush operations in this and in other embodiments using inlet and outlet ports, the fluid flow into and out of inlet 16 and microchannels 32 is blocked and/or stopped by fluid controls of the heat exchange system as understood by one of ordinary skill in the art.

As can be seen in FIG. 2A, the outlet ports 28 have angled jets 28a configured to provide an angled flow direction away from the screen 20. In an embodiment, the angle α may be between 0° and 90°. In another embodiment, the angle may be between 0° and 32°. In yet another embodiment, the angle may be 18° to allow the velocity near the screen 20 to remain high. In other embodiments, jets may be provided to inlet ports to provide an angle of flow impingement onto the screen.

The screen 20 is perforated by apertures 20a shown on FIG. 2A and as apparent on other figures. The apertures are sized to prevent particulates or contamination from entering the microchannels 32 where particulates and fouling are more difficult to remove. In an embodiment, the apertures may have a diameter or maximum cross-sectional distance equal to one-third of the minor diameter of the microchannels 32. In an embodiment, the apertures may have a diameter or maximum cross-sectional distance of between 0.1-1 mm. The apertures may have round, oval, square, rectangular or other shapes. The apertures capture particulate or fouling material contaminants by capturing the contaminants before entering the apertures and/or by blocking the passage of the contaminants before they reach the microchannels 32. Contaminants may then be easily removed by reversing the direction of flow through the screen 20. The flow orientation is normal to the particulate layer and thus removes fouling effectively. Flushing fluid discharged from the header 10 may be filtered and/or collected via a secondary fluid system (see, e.g., filter 107 and optional open tank 108 in FIGS. 6 and 7).

In an embodiment, screen 20 may be manufactured by chemical etching and diffusion bonding. In an embodiment, eight layers of 0.006" stainless steel sheets are bonded with holes of diameter 0.011 inches (0.298 mm). This hole size is consistent with an aperture diameter that is no greater than one third of the channel minor diameter of the generally semi-circular channels. The number of apertures may be determined by predicted head loss of the filter plate to minimize pressure loss. A preferred screen aperture pattern provided 1,256 apertures/in$^2$ and had a predicted pressure drop of 1.021 psi at the flow rate expected in testing. The screen 20 may be flat, cylindrical, spherical, or other shape.

Figure 2C:
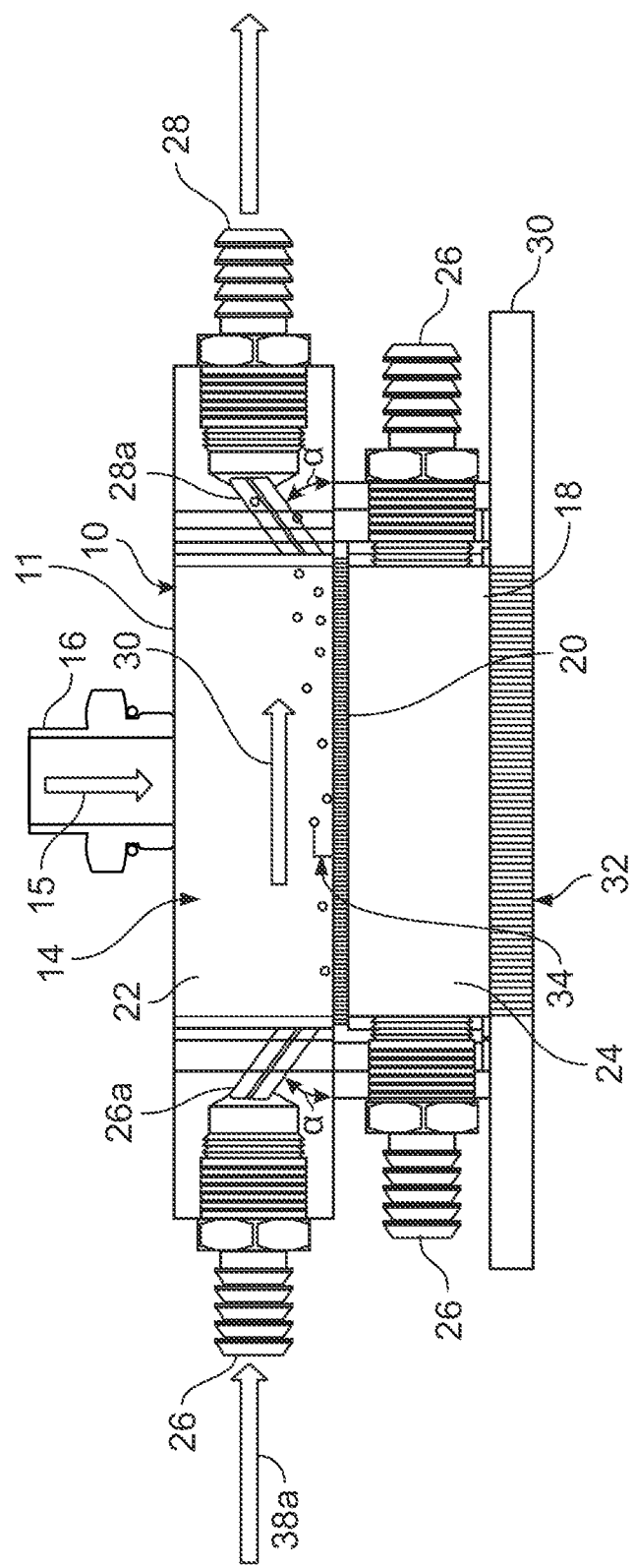
FIG. 2C is a cross sectional view of the header of FIG. 2 and a partial cross-sectional view of a portion of a heat exchanger body to which it is attached having an alternative backflushing configuration according to another embodiment of the present invention that uses cross-flow cleaning.

FIG. 2C illustrates an alternate embodiment of a header 10 that may result from a modification of the header shown in FIG. 2A. Header 10 includes cavity 14 that includes an upper cavity 22 and a lower cavity 24 in housing 11. The header 10 includes cleaning inlet port 26 and cleaning outlet port 28. The flow 30 between cleaning inlet and outlet ports 26, 28 creates a cross flow path that provides high shear across screen 20, indicated by arrow 30. Flow 30 across a fouled surface of screen 20 lifts particulate or contaminant matter 34 and removes it from the header 10 during cleaning. In this exemplary embodiment, the header 10 includes one inlet port 26 and one outlet port 28 disposed on opposing sides of upper cavity 22. The cleaning inlet and outlet ports 26, 28 include jets 26a, 28a as discussed above. In other embodiments, the header 10 may include one or more inlet and outlet ports located at various positions around the upper cavity 22.

The flow path 30 between the inlet and outlet ports 26, 28 subject the screen surface adjacent to the flow path to a high shear flow that facilitates removal of contaminants from the screen surface. In other embodiments, the apertures may be sized to both block and capture contaminants.

As can be further seen in this exemplary embodiment, the header 10 includes a lower cavity 24 and includes cleaning ports 26 adjacent to the lower cavity 24 that are not used for backflushing. This embodiment illustrates how the embodiment shown in FIG. 2 could be modified and/or retrofitted to operate as discussed above. In alternative embodiments, the cleaning inlet ports 26 may be removed and or the lower cavity 24 may be reduced in volume or deleted. For example, in an embodiment, the lower cavity 24 may be deleted and the screen 20 may be adjacent to the microchannels 32. In other embodiments, the volume of lower cavity 24 may be significantly reduced to create only a small cavity volume between the screen 20 and the outlet 18. A small lower cavity volume facilitates flow redistribution that is expected to promote uniformity in flow rate in microchannels 32, especially when a portion of screen 20 is clogged.

Referring to FIGS. 2A and 2C, the cleaning inlet and outlet ports 26, 28 are configured to provide an angled flow direction towards and away from the screen 20. In this embodiment, the angle of impingement/removal a is the same for inlet and outlet, in other embodiments, the angle may be the same or different. In an embodiment, the angle α may be between 0° and 90°. In another embodiment, the angle may be between 0° and 32°. In yet another embodiment, the angle may be 18° to allow the velocity near the filter surface to remain high for a greater span of the screen 20, and thus provide more effective cleaning. Reducing the impingement angle may increase velocity near the surface, however, 0° did not disperse particulate as well and instead developed a narrow stream between the inlet and outlet ports.

Additionally, in the exemplary embodiment of FIG. 2C, the inlet and outlet ports 26, 28 are positioned opposite of each other on the header 10. In other embodiments, one or more inlet and outlet ports 26, 28 may be used that may be positioned at various positions around the cavity 14. Furthermore, the inlet and outlet ports 26, 28 are connected to a fluid system (not shown) for cleaning/flushing the header 10, the fluid system including filters, flow control, pumping, and storage components as would be well understood in the art.

Figure 3:
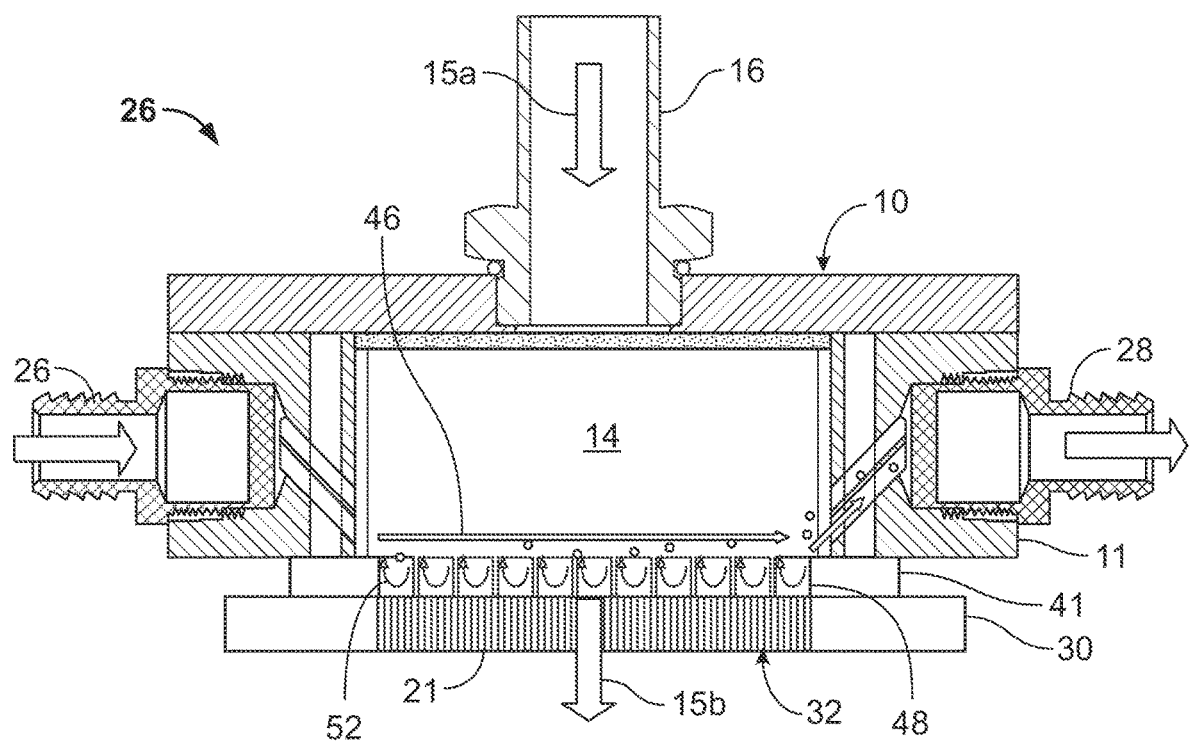
FIG. 3 shows a header according to another embodiment of the invention that uses vortical flow cleaning.
Figure 3A:
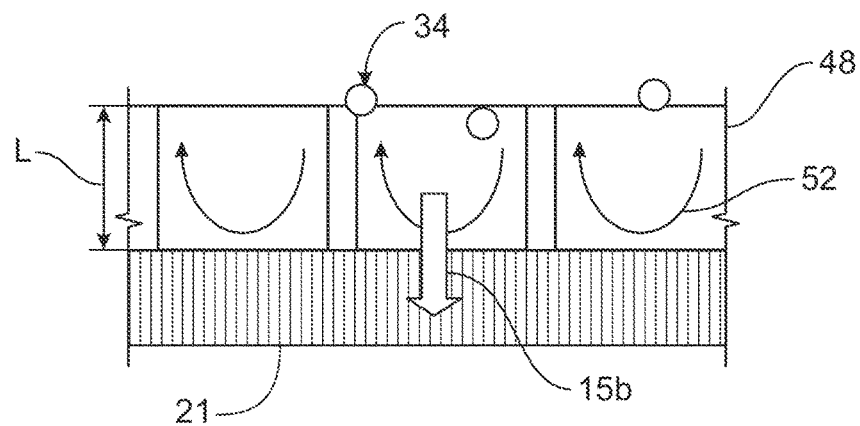
FIG. 3A shows a cross sectional view of a portion of wells according to an embodiment of the invention.

FIGS. 3 and 3A illustrate another embodiment of a header 10. As can be seen in FIG. 3, the cavity 14 is not separated into upper and lower cavities. Fluid from cleaning inlet port 26 flowing across cavity 14 to cleaning outlet port 28 sweep or remove contaminants 34 from the header 10. The flow of fluid across cavity 14 is indicated by arrow 46. Prismatic cavities or wells 48 are disposed across the bottom of cavity 14 within housing 41 and between the cavity 14 and microchannels 32. Referring to FIGS. 3. and 3A, fluid crossflow 46 induces vortices 52 to sweep away contaminants 34 in wells 48. Vortices 52 push contaminants away from microchannels 32. In this exemplary embodiment, cleaning inlet port 26 is disposed opposite outlet port 28. In other embodiments, one or more inlet and outlet ports may be disposed around the cavity 14. Also, the angle of impingement/removal may be arranged as discussed above to improve the removal of contaminants and to increase vortex formation.

An enlarged portion of wells 48 are as shown in FIG. 3A. In this exemplary embodiment, the wells 48 have a square cross section. What distinguishes wells 48 from the apertures of screen 20 in the above embodiments in that the wells 48 have a cross section and depth (in the direction of operational fluid flow 15a, 15b) sufficient for creating backsweeping vortices 52 during fluid cleaning that removes contaminants 34 away from the microchannels 32. In other embodiments, a screen may be disposed between the wells 48 and the microchannels 32. In another embodiment, there may be a shallow cavity between a screen and microchannels 32 for flow redistribution. In an embodiment, the width and depth may be between 1-50 mm. In another embodiment, the width and depth may be between 5-20 mm. It should be understood that in the cross-sectional view, the wells 48 are present over the opening 18, being present in the space into and out of the figure drawing. Additionally, as this is a cross sectional view, there are lines present atop and below the wells on the figure that are the structure of wells further into the figure, and those lines are not to imply that the wells 48 are capped at either end, on the contrary, the wells 48 are open on both ends to allow operational flow 15a, 15b to flow through the wells 48. In another embodiment, the wells 48 may be arranged in a grid across the width of header 10 whose openings to cavity 14 are rectangular, square, or other shape. In an embodiment, the wells 48 may be considered a series or plurality of troughs having a rectangular cross section, wherein the plurality of parallel troughs have an overall width that spans the width of outlet 18 and whose openings to cavity 14 and cross sections are rectangular.

In the exemplary embodiment of FIG. 3A, the wells 48 have a square cross section. A square cross section creates vortices 52 having a circular flow paths to generate maximum energy and higher flow velocity, which does not consume energy in the deformation of the vortices. In other embodiments, wells 48 may have other cross sections, such as, but not limited to squares, rectangles, and ellipses. Similar to the crossflow of FIG. 2, the flow path 46 from the inlet port 26 to the top of wells 48 provides high velocity flow driving the vortices 52 across the maximum surface area. The vortical flow arrangement of FIG. 3 provides a simplified header 10 for fouling removal by vortical shear forces through a secondary flow effect instead of a primary flow effect associated with the embodiments of FIG. 2.

Header 10 provides normal heat exchanger flow while also being configured to incorporate a cleaning structure and process when particulates 34 collect on the surface of or in the screen 20 or wells 48 or within the header 10. The disclosed embodiments include backflow, crossflow, and vortical flow cleaning methods. The various embodiments may be configured in two or more parts to reduce costs.

With respect to FIG. 3, the entry length of the microchannels 32, commonly referred to as a distributor section, may be configured with an array of fins so that under different flow velocities the distributor section modifies at least a portion of the fluid flowing through the heat exchanger, to reverse and locally dislodge the fouling material that builds up at the core face of heat exchanger 2. At higher velocities a steeper pressure gradient is present in the heat exchanger core and the inlet ports may provide a wider-angle stream across the face of core 5. Allowing the inlet ports to spread within the cavity induces recirculation zones to clean the core face by secondary flow action.

Figure 4:
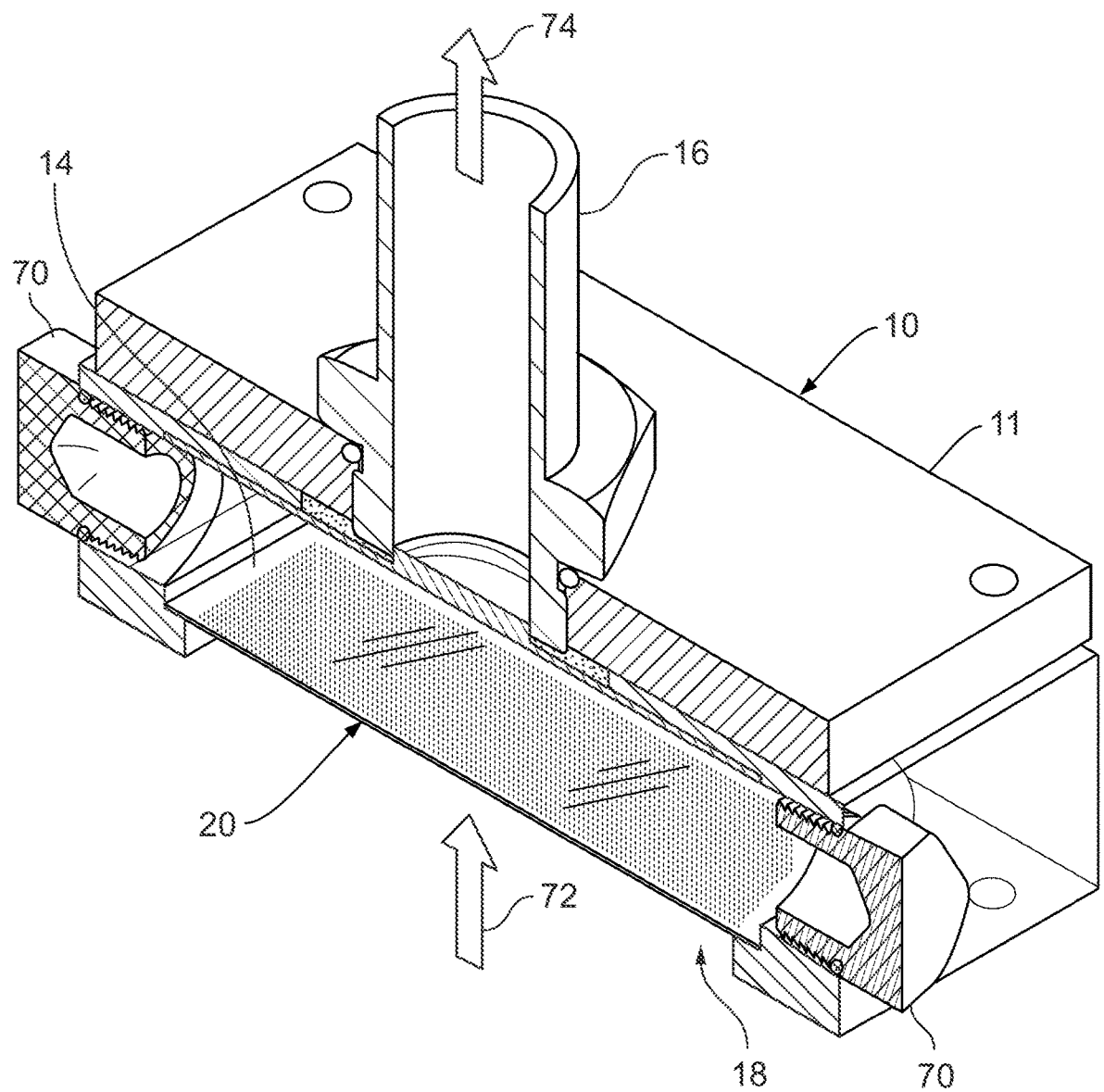
FIG. 4 shows a cross sectional view of a header according to another embodiment of the invention without side ports.

FIG. 4 shows a header 10 according to another embodiment of the invention. The header 10 includes a housing 11 defining a cavity 14, and inlet 16 and outlet 18 to the cavity. The header 10 further includes a screen 20 disposed proximate the outlet 18. In this embodiment, cleaning inlet and outlet ports have been replaced by plugs 70. In this exemplary embodiment, the screen 20 is backflushed by reversing the flow of fluid through the heat exchanger shown by arrows 72, 74 or by removing the header 10 from the heat exchanger and backflushing in the direction of arrows 72, 74.

Figure 5:
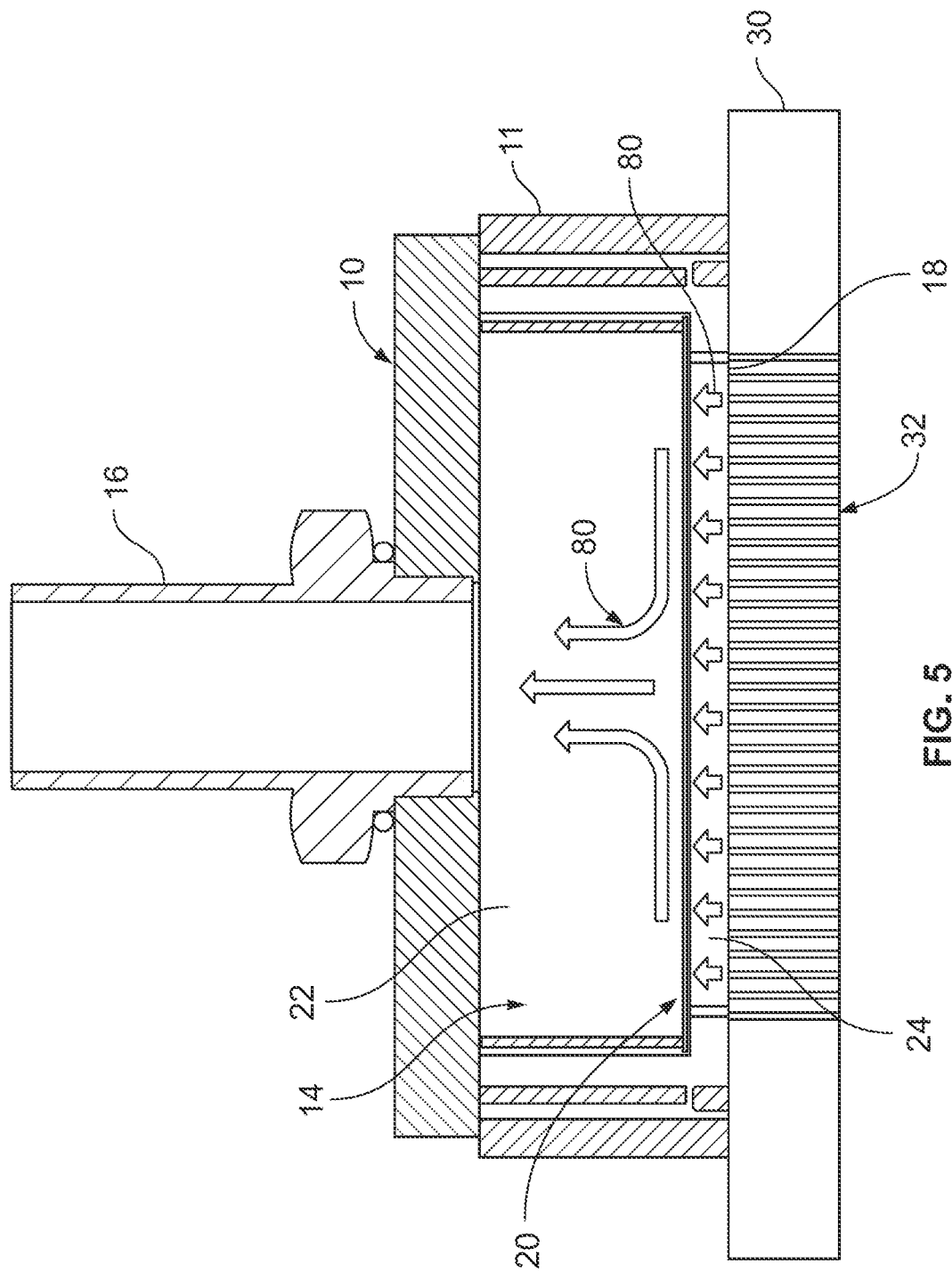
FIG. 5 shows a cross sectional view of a header according to another embodiment of the invention of FIG. 4.

FIG. 5 shows a header 10 attached to a heat exchanger body 30 including microchannels 32 according to another embodiment of the invention. The header 10 includes a housing 11 defining a cavity 14, and inlet 16 and outlet 18 to the cavity. The header 10 further includes a screen 20 that divides the cavity 14 into upper and lower cavities 22, 24. In this exemplary embodiment, the lower cavity 24 has much less volume than the upper cavity 22. In this embodiment, the housing 11 includes no cleaning inlet or outlet ports, and backflushing of fluid flow as shown by arrows 80 is performed by providing fluid from the microchannels 32 through the cavity 14 and screen 20 to be discharged from the inlet 16.

Figure 6:
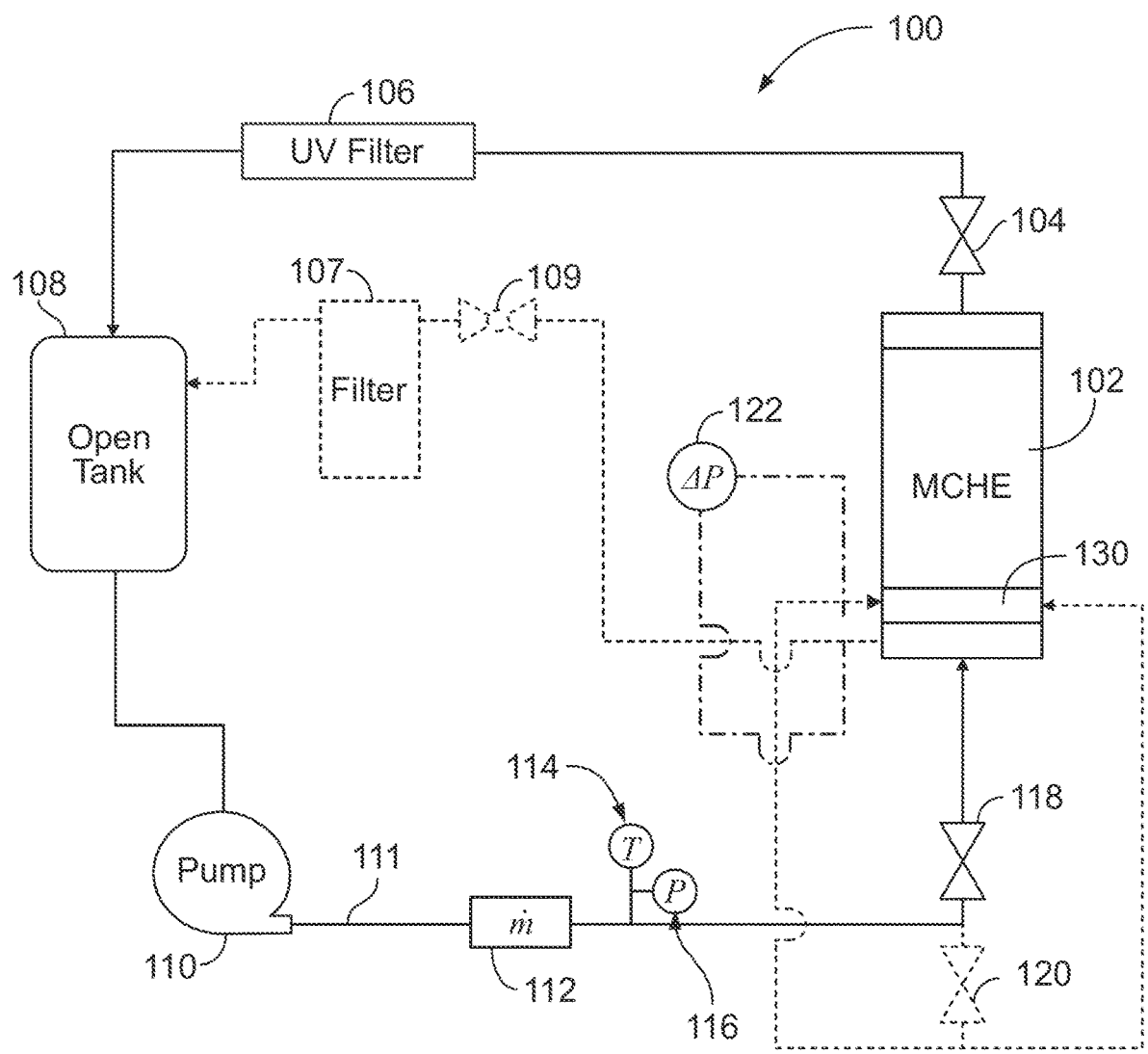
FIG. 6 shows a schematic flow diagram of an exemplary embodiment for backflow cleaning for normal and cleaning flow paths.

FIG. 6 is a schematic flow diagram 100 illustrating normal operation flow and backflow cleaning operation flow. An exemplary heat exchanger 102 is connected to the system with several connections through shut off valves 104, 118. Open tank 108 receives filtered fluid from filter 107 and discharges the fluid to a pump 110. Filter 107 is connected between tank 108 and header 130 through a shut off valve 109, which is closed during normal operation to prevent fluid flowing from tank 108 and header 130. In normal operation, pump 110 is in flow communication with header 130 through shut off valve 118 and valve 120 is closed. Header 130 receives fluid from pump 110 through valve 118 during normal operation, and returns the fluid to heat exchanger 102, as described above with respect to FIGS. 2-3 for headers with one or more cleaning ports.

During cleaning operation flow, fluid flow is reversed through header 130. Valves 104 and 118 are closed. Pressure drop across header 130 may be measured by an optional meter 122. In other embodiments valves 118 and 120 may be replaced by a single 3-way valve with one inlet and two outlet options. Additionally, the filter 107 is optional if the particulate may be separated from the fluid recirculated within the system without the need of a filter e.g. through the use of a settling tank.

Figure 7:
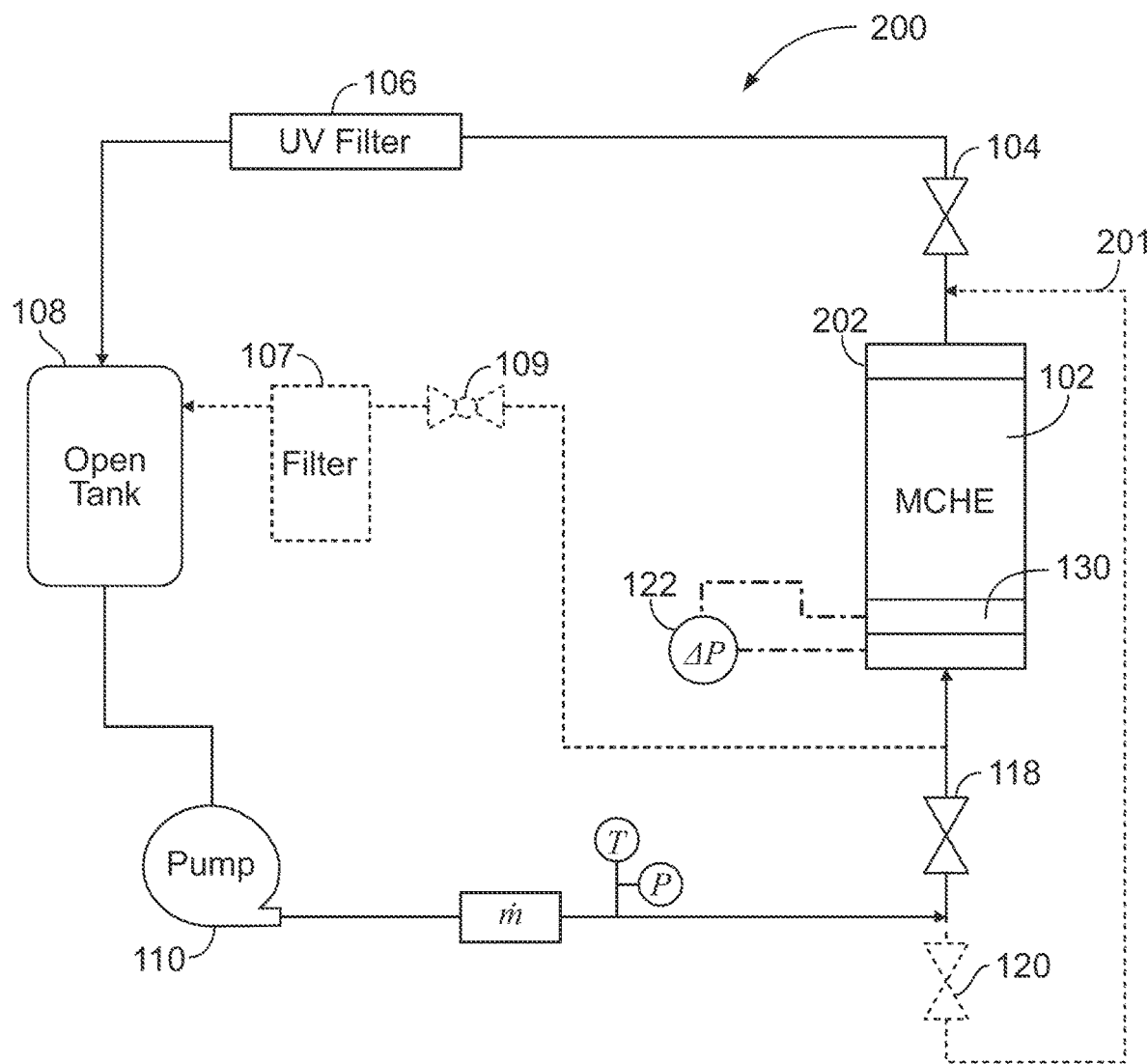
FIG. 7 shows an alternate flow diagram 200 to describe reverse flush operations for normal and cleaning flow paths.

Referring now to FIG. 7, an alternate flow diagram 200 is shown to describe normal operation and reverse flush cleaning operation. Heat exchanger 102 is connected to the system with only the typical inlet and outlet ports. Open tank 108 receives filtered fluid from an optional filter 107 and discharges the fluid to a pump 110. Filter 107 is connected between tank 108 and the main fluid stream through a shut off valve 109, which is closed during normal operation to prevent fluid flowing between tank 108 the main fluid stream. In normal operation, pump 110 is in flow communication with header 130 through shut off valve 118 and shut off valve 120 is closed. Header 130 receives fluid from pump 110 through valve 118 during normal operation, and returns the fluid to heat exchanger 102. Pressure differential may be measured across header 130 via meter 122. Also note that valves 118 and 120 may be replaced by a single 3-way valve with one inlet and two outlet options. FIG. 7 relates to the header embodiment of FIGS. 4 and 5 without cleaning ports.

During cleaning operation in the reverse flush arrangement of FIG. 7, fluid flow is reversed through heat exchanger 102 and header 130. Valves 104 and 118 are closed, and valves 120 and 109 are opened to allow fluid communication between header 130 and tank 108, through a filter 107 connected to valve 109. Valve 120 directs flow backwards through heat exchanger 102 through a bypass line 201. Flow is thus reversed and fluid flushes header 130, into valve 109, through filter 107, and back into tank 108.

Figure 8:
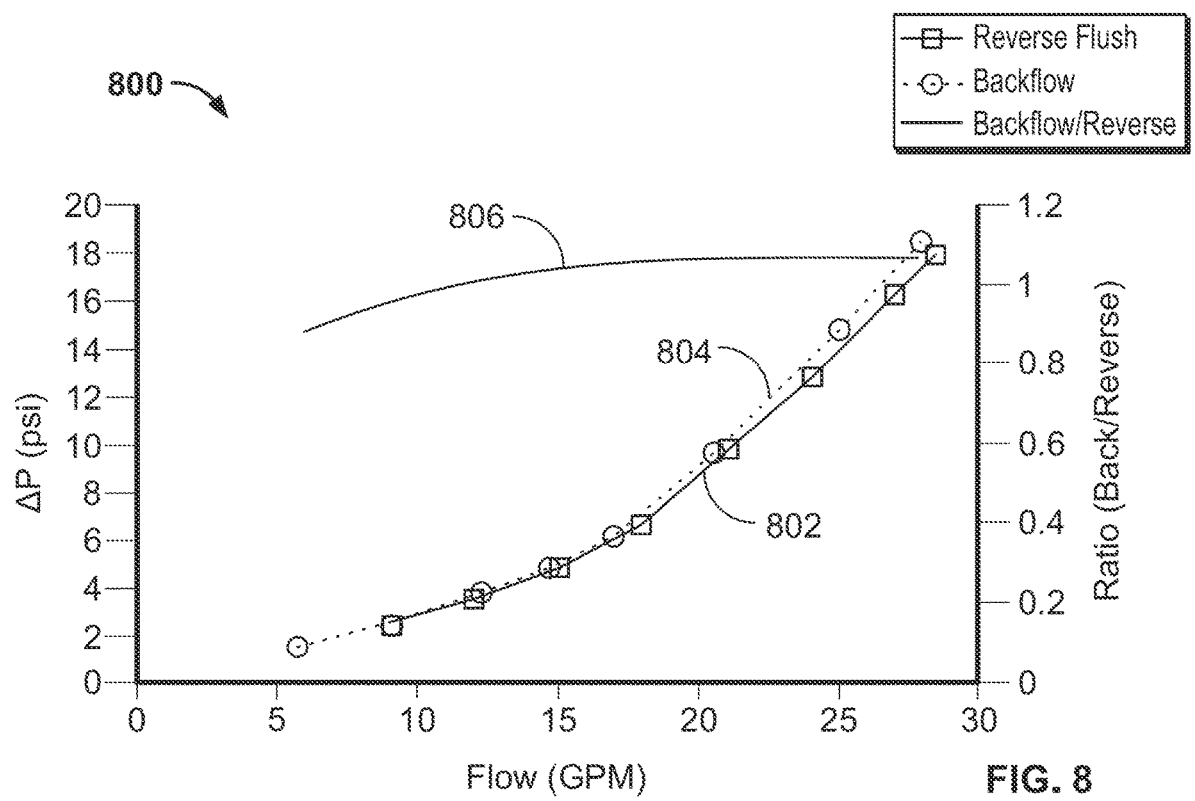
FIG. 8 shows a graph of pressure drop comparison of backflow and reverse flush system across a complete, clean heat exchanger under normal flow conditions.

Referring next to FIG. 8, a graph 800 shows normal flow across the clean heat exchanger, in gallons per minute (GPM), versus pressure change, in pounds per square inch (PSI), for reverse flush method, indicated by line 802, and for backflow, indicated by line 804. Line 806 indicates the ratio of backflow to reverse.

Figure 9A:
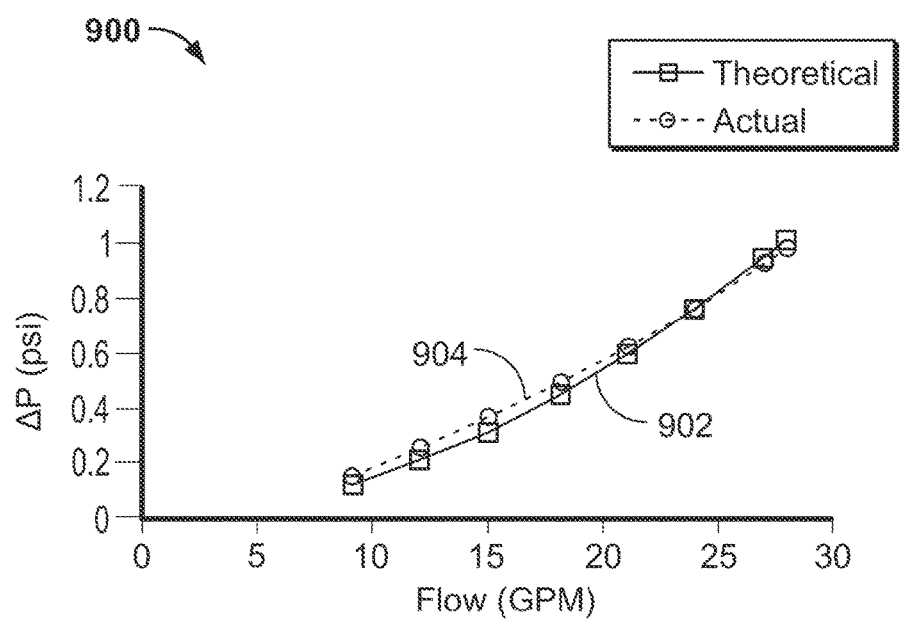
FIG. 9A shows a graph of the theoretical and measured pressure drop across the in-header filter for the reverse flush flow path while clean.

Referring now to FIG. 9A, a graph 900 shows the pressure drop across the in-header filter between flows ranging from about 8 GPM to about 28 GPM, for theoretical or predicted pressure drop indicated by line 902, and actual or measured pressure drop values indicated by line 904, for the reverse flush cleaning configuration.

Figure 9B:
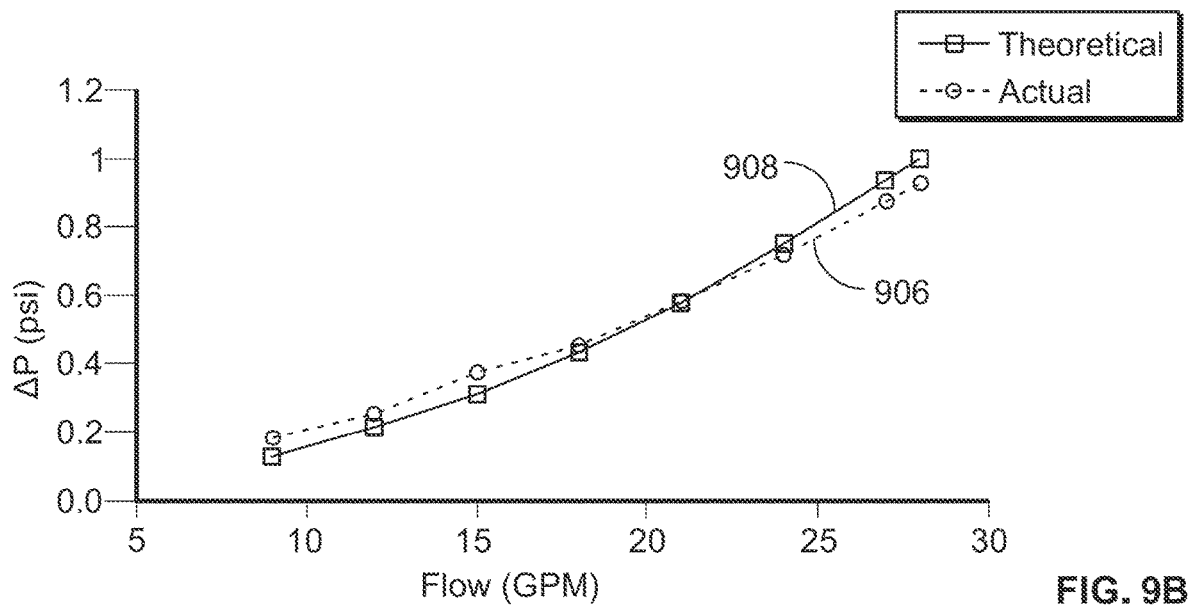
FIG. 9B shows a graph of the theoretical and measured pressure drop across the in-header filter for the backflow flow path while clean.

FIG. 9B shows a graph of the pressure drop across the in-header filter between flows ranging from about 8 GPM to about 28 GPM, for actual pressure measurements indicated by line 906, and theoretical or predicted pressure drop values indicated by line 908, for the backflow cleaning configuration. Table 1 below shows the prediction error for actual versus predicted pressure drop ($\Delta P$) for each method.

TABLE 1

| Filter Plate $\Delta P$ Prediction Error (%) Backflow | Filter Plate $\Delta P$ Prediction Error (%) Reverse Flush |
|---|---|
| −30.478 | −11.607 |
| −17.768 | −14.059 |
| −17.064 | −12.309 |
| −4.052 | −8.053 |
| 0.272 | −4.308 |
| 3.782 | −0.247 |
| 6.517 | 2.152 |
| 7.735 | 3.874 |

Figure 10:
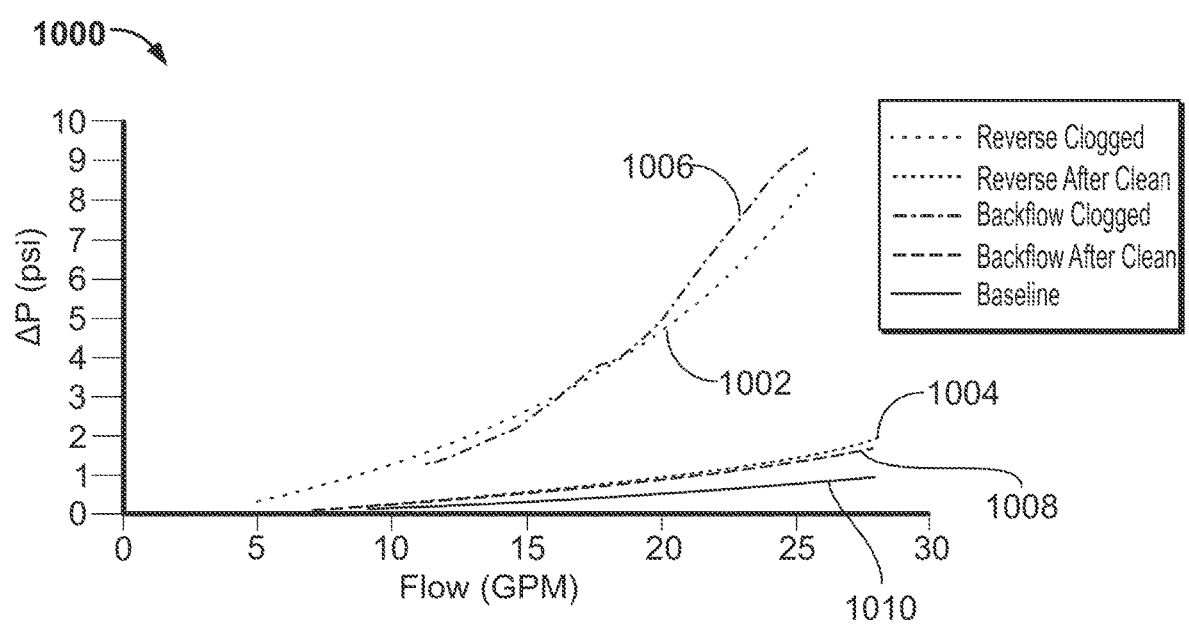
FIG. 10 shows a graph comparing pressure drops across the in-header filter for conditions of baseline (completely clean), clogged, and after cleaning in place for both backflow and reverse flush configurations.

FIG. 10 is a graph 1000 showing the pressure drop $\Delta P$ across the filter plate or screen 20 associated with various flow rates ranging from about 5 GPM to about 28 GPM, contrasting fouled pressure drop before cleaning with pressure drop after cleaning for backflow and reverse flush methods. Line 1002 indicates $\Delta P$ for a reverse flow configuration that is clogged—i.e., before cleaning. Line 1004 represents the $\Delta P$ after cleaning for the reverse flow configuration. Line 1006 represents $\Delta P$ for a backflow configuration that is clogged. Line 1008 represents the $\Delta P$ after cleaning for the reverse flow configuration. Line 1010 represents a baseline pressure drop in either configuration.

While the exemplary embodiments illustrated in the figures and described herein are presently preferred, it should be understood that these embodiments are offered by way of example only. Accordingly, the present application is not limited to a particular embodiment but extends to various modifications that nevertheless fall within the scope of the appended claims. The order or sequence of any processes or method steps may be varied or re-sequenced according to alternative embodiments.

It is important to note that the construction and arrangement of the flow-assisted anti-fouling geometries for compact heat exchangers, as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

The invention claimed is:

1. A header for a heat exchanger comprising:
    a heat exchanger in flow communication with the header, the heat exchanger configured to distribute fluid through a plurality of adjacent channels, the header connected between at least one heat exchanger inlet and a channel flow distributor;
    a channel flow distributor comprising a plurality of secondary cavities disposed adjacent to and upstream of the heat exchanger in fluid communication with the channels
    the header comprising a housing having a main cavity comprising an inlet port on one end of the housing and an outlet port on the opposite end of the housing;
    the inlet port and the outlet port configured to generate a flowpath of fluid across the channel flow distributor secondary cavities;
    wherein the vortical flows are induced in the secondary cavities to generate cross-step filtration and localized vortical cleaning for removal of a particulate matter and a fouling material.

2. The header of claim 1, wherein each of the secondary cavities comprises a square cross-sectional shape configured to generate circular flowpaths.

* * * * *